A. REINLE.
SHOW CASE.
APPLICATION FILED OCT. 29, 1909.
952,945.
Patented Mar. 22, 1910.
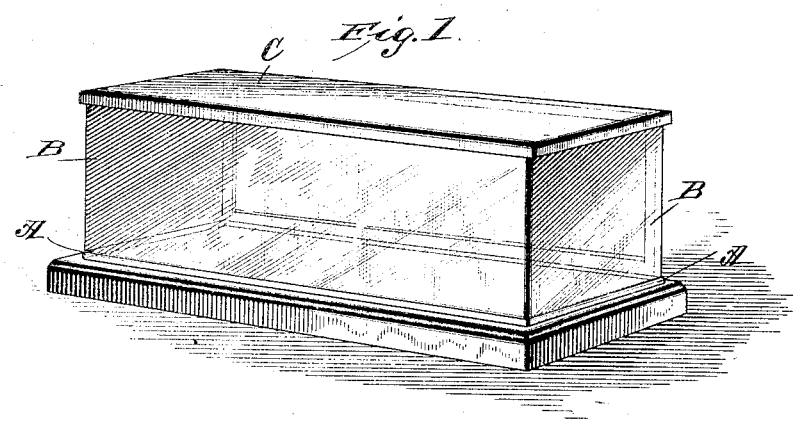
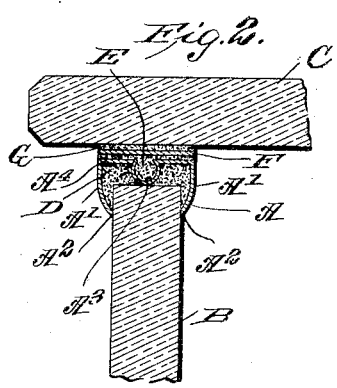
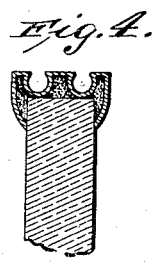
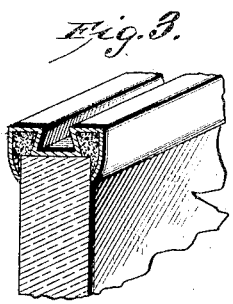
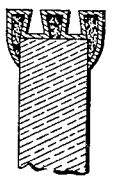
WITNESSES
E. M. Callaghan
Perry B. Turpin
INVENTOR
AUGUST REINLE
BY Munn & Co.
ATTORNEYS

UNITED STATES PATENT OFFICE.

AUGUST REINLE, OF BALTIMORE, MARYLAND.

SHOW-CASE.

952,945.

Specification of Letters Patent. Patented Mar. 22, 1910.

Application filed October 29, 1909. Serial No. 525,317.

*To all whom it may concern:*

Be it known that I, AUGUST REINLE, a citizen of the United States, and a resident of the city of Baltimore, in the State of Maryland, have invented certain new and useful Improvements in Show-Cases, of which the following is a specification.

This invention is an improvement in show cases such for instance as the ordinary inside show cases, outside show cases, and cases in the form of show windows and the like; and the invention consists in certain novel constructions and combinations of parts as will be hereinafter described and claimed.

In the drawing Figure 1 is a perspective view of a show case embodying my invention. Fig. 2 is a detail cross section showing the joint between two abutting plates. Fig. 3 is a detail perspective view illustrating the channel strip with a somewhat different form of undercut groove in its upper side. Fig. 4 is a cross section showing a channel strip of the form shown in Fig. 2 with a plurality of undercut grooves and Fig. 5 is a sectional view illustrating a channel strip of the form shown in Fig. 3 with a plurality of undercut grooves.

In carrying out my invention, I provide a channel strip A which fits over the edge of the glass plate B and is connected with the under surface of the glass plate C in a manner more fully described hereinafter. In securing the channel strip A to the glass plate B, I employ cement D within the channel strip and securing the same in connection with the glass plate. In doing this, the cement will adhere strongly to the glass plate B and will harden within the channel strip A and in order to secure the channel strip from displacement, I form the said strip with means to interlock with the cement in such manner that when the cement hardens the channel strip cannot be pulled off of the cement and the cement by strongly adhering to the plate B will unite the channel strip firmly in connection with the plate B as desired. In carrying out this feature of my invention the side wings A' of the channel strip have their free edges at A² deflected inwardly to bear against the sides of the glass plate B and to underlie the side portions of the cement D. It will be noticed that the said side wings extend for a short distance along the side of the plate B before they are deflected inwardly forming receptacles in which the side portions of the cement D are received so that the lower free edges of the side wings underlie the cement and prevent any displacement of the channel strips.

Instead of securing the interlocking connection in the manner before described, I may interlock the cement and channel strip by forming the strip with a longitudinal under cut groove or corrugation A³ in its upper side, the said undercut groove or corrugation fitting within the cement so that the cement will interlock therewith, the corrugations being undercut as before described and as shown in Figs. 2 to 5 of the drawings; but it is preferred to secure this interlocked connection between the channel strip and the cement by both the side wing formation and the undercut corrugation, as shown, as thereby I secure a double interlock and a connection between the channel strip and the cement at four different points, that is to say at the free edges of both wings and on opposite sides of the longitudinal corrugation which forms the undercut groove in the upper face or top plate A⁴ of the channel strip. This longitudinal undercut groove in the upper face of the channel strip has the additional function of securing an interlocked connection between the channel strip and the plate C whose face is connected with the top plate of the channel strip. In doing this, the cement E which operates to connect the plate C with the channel strip fits in the undercut groove at A³ which operates to key the cement to the said channel strip as will be understood from the drawing. In this construction it will also be noticed the longitudinal undercut corrugation bears in the assembled position of the parts against the edge of the plate B and steadies and reinforces the channel strip in its position when applied. While the cement E may be utilized in connecting the channel strip directly with the surface of the plate C, it may be preferable in some instances, especially where desired for the purposes of repair or replacing glass, to employ in forming the connection between the channel strip and the plate C, an intermediate facing F which may be of heavy paper, double faced Windsor cloth or other material which can be easily split or separated with a saw or knife. Such an intermediate sheet is shown at F in Fig. 2 and is united to the channel strip A by the cement E and a separate layer of cement G secures the sheet F to the under surface of the plate C, the separable sheet F thus forming a part of the connection between the channel strip and the plate C. In the operation this sheet F can be conveniently severed by a knife or saw avoiding the necessity of cutting the cement which is somewhat difficult when the cement has hardened as is well understood by those skilled in the art.

While the undercut groove or corrugation may preferably be rounded in cross section as shown in Fig. 2, it will be understood that it may be made in the dove-tail form shown in Fig. 3, when so desired and the grooves or corrugations may be employed in a series, if desired as illustrated in Figs. 4 and 5 of the drawings.

I claim:

1. The combination with adjoining glass plates of a channel strip fitting over the edge of one of the plates and having its side wings extending alongside the said plate and deflected at their free edges to underlie a cement filling, the end plate of the said channel strip having a longitudinal corrugation forming an undercut groove in the outer face of the strip and the said corrugation bearing against the edge of the plate upon which the said strip is fitted, a cement filling within the channel strip and against the edge of the said plate, the side wings of the channel strip underlying the cement filling and interlocking the channel strip therewith, cement in the undercut groove and over the end plate of the strip, a separable sheet held by said cement, and cement uniting said separable sheet with the face of the abutting glass plate substantially as set forth.

2. A channel strip for show-cases having its end plate provided with an undercut groove or channel whereby cement applied thereto will be interlocked with the channel strip, a plate fitted flat-wise to said end plate and cement between said plates and in the undercut groove of the strip plate.

3. A channel strip for show-case joints having side wings deflected inwardly at their side edges whereby to under-lie and interlock with a cement filling applied within said strip, the strip having its end plate provided with a longitudinal corrugation forming an undercut groove or channel adapted to interlock with cement applied within said strip, combined with a glass plate fitted flat-wise to said end plate and cement between said plates and in the undercut groove of the strip plate.

AUGUST REINLE.

Witnesses:
SOLON C. KEMON,
PERRY B. TURPIN.